United States Patent [19]
Kubinski

[11] 3,904,471
[45] Sept. 9, 1975

[54] TIRE BUILDING APPARATUS

[75] Inventor: Donald C. Kubinski, Wadsworth, Ohio

[73] Assignee: The Goodyear Tire & Rubber Company, Akron, Ohio

[22] Filed: Oct. 15, 1974

[21] Appl. No.: 514,348

[52] U.S. Cl.................................. 156/405; 156/123
[51] Int. Cl.²......................................... B29H 17/20
[58] Field of Search......... 156/405, 405 P, 123, 398

[56] References Cited
UNITED STATES PATENTS

| | | | |
|---|---|---|---|
| 1,255,073 | 1/1918 | Abbott.............................. | 156/405 X |
| 1,327,910 | 1/1920 | Harsel.............................. | 156/405 X |
| 1,419,064 | 6/1922 | Landon............................. | 156/405 |
| 1,671,941 | 5/1928 | Sterens............................. | 156/405 |
| 1,717,845 | 6/1929 | Irrgang............................. | 156/405 |
| 1,734,242 | 11/1928 | Wikle.............................. | 156/405 |
| 1,762,752 | 6/1930 | Abbott.............................. | 156/405 X |
| 1,938,787 | 12/1933 | Abbott.............................. | 156/405 |
| 1,957,981 | 5/1934 | Shook.............................. | 156/405 X |
| 2,035,422 | 3/1936 | Breth et al........................ | 156/405 X |
| 2,259,162 | 10/1941 | Hirsch et al...................... | 156/405 X |
| 2,588,207 | 3/1952 | Cleland et al..................... | 156/405 X |
| 2,665,757 | 1/1954 | Stevens et al..................... | 156/405 X |
| 2,690,784 | 10/1954 | Haase.............................. | 156/405 X |
| 2,988,131 | 6/1961 | Frohlich et al.................... | 156/405 |
| 3,547,732 | 12/1970 | Leblond........................... | 156/405 |
| 3,595,724 | 7/1971 | Leblond........................... | 156/405 |
| 3,654,828 | 4/1972 | Leblond et al..................... | 156/405 |
| 3,728,181 | 4/1973 | Simmons, Jr....................... | 156/405 |
| 3,841,941 | 10/1974 | Leblond........................... | 156/405 |
| 3,844,871 | 10/1974 | Habert et al...................... | 156/405 |
| 3,852,142 | 12/1974 | Leblond et al..................... | 156/405 |

FOREIGN PATENTS OR APPLICATIONS 663,312  12/1951  United Kingdom.................. 156/405

Primary Examiner—Clifton B. Cosby
Attorney, Agent, or Firm—F. W. Brunner; R. S. Washburn

[57] ABSTRACT

Tire building apparatus for applying narrow strip, such as a chipper, a chafer, or the like on a tire carcass supported on a building drum. An applying wheel pressed against the carcass to roll thereon transfers the strip from a guide palm. When about three-fourths of the desired circumferential length of the strip is laid about the carcass, the palm is raised outwardly of the wheel carrying the strip held thereby past a fixed hot knife, severing the appropriate length of the strip which continues on to the carcass. The operation can be entirely automatic.

The foregoing abstract is not to be taken as limiting the invention of this application, and in order to understand the full nature and extent of the technical disclosure of this application, reference must be made to the accompanying drawing and the following detailed description.

2 Claims, 3 Drawing Figures

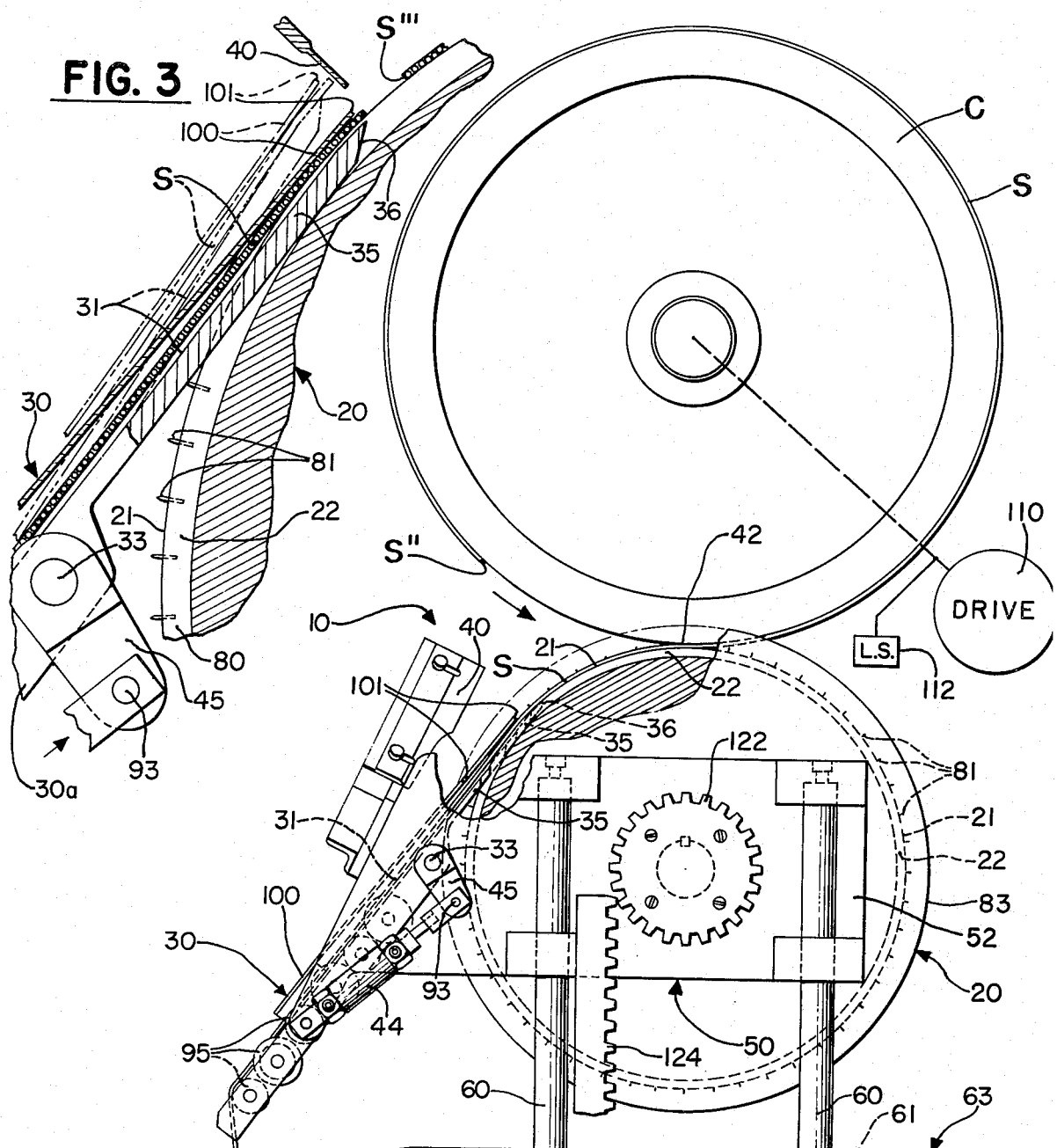

TIRE BUILDING APPARATUS

The present invention relates to tire building apparatus and particularly to an apparatus or device for applying to a tire carcass, a narrow strip of tire building stock such as a chipper, a chafer, or the like.

It is an object of the invention to improve the accuracy and efficiency of applying a narrow strip of tire building material to a tire carcass.

To acquaint persons skilled in tire building with the principles and practices of the invention, a presently preferred embodiment and best known mode of practice of the invention are set forth in the following description and in the attached drawings, in which:

FIG. 2 is an elevation view, as indicated by the line 2—2, of the apparatus of FIG. 1; and FIG. 3 is an enlarged sectional view of a portion of the apparatus of FIG. 1, taken as indicated by the line 3—3 therein.

Figure 1:
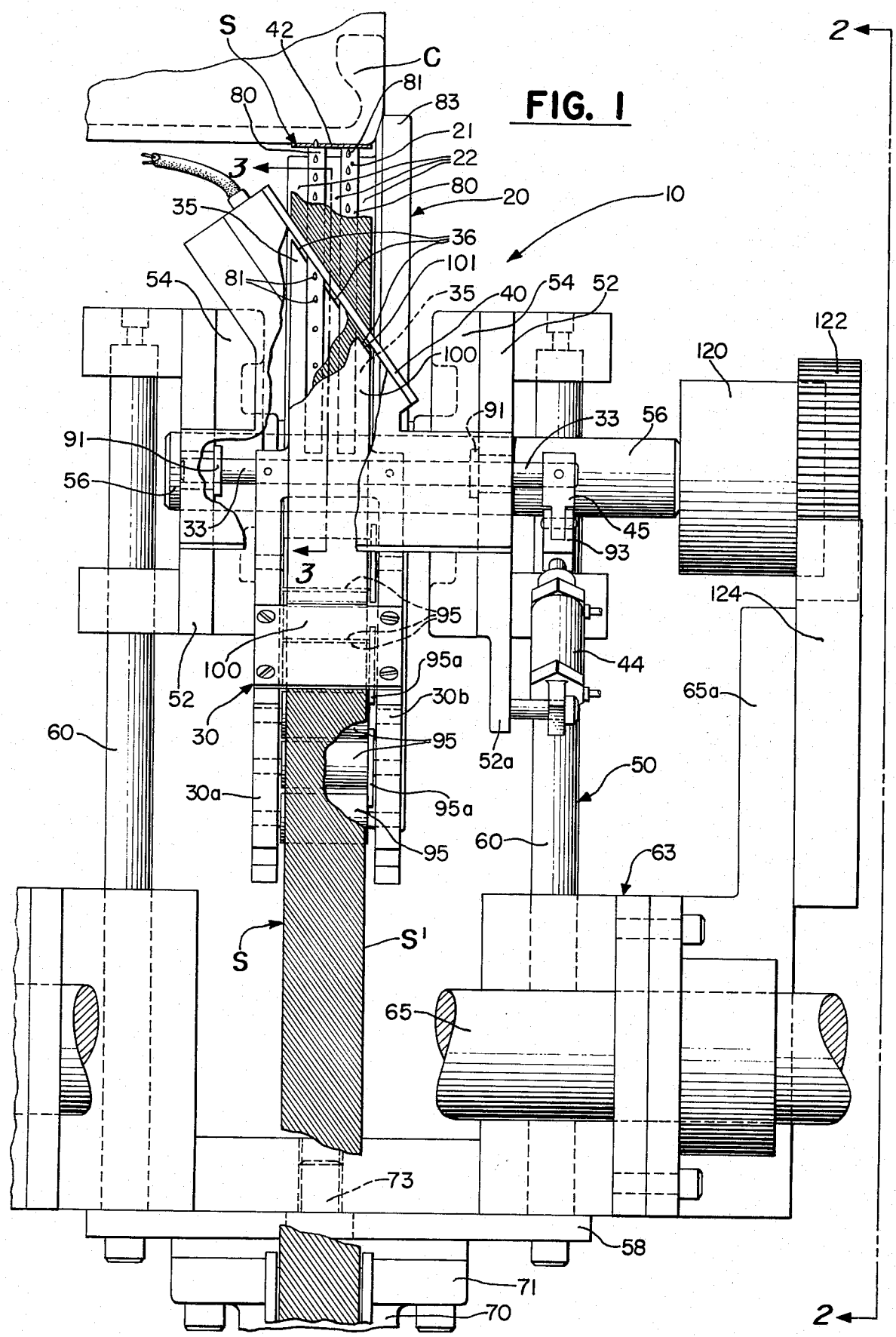
FIG. 1 is an elevation view of an apparatus according to the invention.

In the specific embodiment illustrated in the drawings, an apparatus 10 according to the invention is particularly adapted to apply to a tire carcass C a narrow strip S known commonly as a chipper. The chipper strip S is a narrow, single ply of bias-cut, wire-reinforced fabric which has been calender-coated with a suitable known rubber compound, then bias-cut, and spliced to form a running length of narrow bias strip. The strip is applied to a tire carcass circumferentially in the bead region as is well understood in the art.

Briefly, the apparatus 10 according to the invention comprises a strip-applying wheel 20 having a circumferential surface 21 for transferring the strip to the carcass, which is mounted on a conventional tire building drum. The wheel is rotatable about an axis parallel to the drum axis. The cylindrical surface 21 of the wheel has a plurality of annular grooves 22 opening to the surface. A strip control palm 30 having a strip conveying guide 31 extending tangentially to the surface 21 of the wheel is mounted on a rock shaft 33 rockable about an axis which is fixed parallel to the wheel axis. The palm 30 has a plurality of fingers 35 extending individually into the respective annular grooves 22. The tips 36 of the fingers terminate in a line extending transversely of the strip at an angle with respect to the axis of the wheel equal to the angle of disposition of the wire reinforcement elements in the strip.

To sever the strip to an appropriate length after the strip has been wrapped part way about the drum, a hot knife 40 is fixed relative to the circumferential surface 21 of the wheel and extends transversely of the strip parallel to the line of the tips 36 of the fingers. Preferably, the knife and the tips of the fingers are disposed close to the nip 42 formed between the wheel and the drum or the carcass to which the strip is applied.

Means for rocking or swinging the rock shaft 33 and the palm 30 fixed thereon are provided in the present embodiment by a single small air cylinder 44 conventionally connected to a crank 45 on the rock shaft 33.

The apparatus thus far described is an integral assembly movable toward and away from the tire building drum between the operative strip-applying relation to the drum or carcass C as illustrated, to a suitably remote location spaced away from the building drum. In the illustrated embodiment, means for moving the applying wheel 20 and the associated elements toward and away from the drum are provided by a frame 50 having a pair of spaced parallel side plates 52 each of which carries a flanged bearing housing 54 in which is mounted a shaft 56 carrying the wheel 20 for rotation about an axis parallel to the building drum axis. The side plates are connected to an elevator plate 58 by four slide rods 60 which extend parallel to the plane defined by the drum axis and the wheel axis. The respective rods 60 are mounted slidably in bushings 61 fixed in a base 63 which itself is mounted slidably in a direction parallel to the drum axis on a pair of support bars 65 parallel to and fixed with respect to the drum axis. Means for adjusting the wheel 20 axially of the tire building drum is provided by a screw 67 which is rotatably fixed on a part of the tire building machine (not shown) and cooperates with a tapped hole 68 in the base 63 to adjust the base and the wheel in a direction parallel to the drum axis.

To move the wheel 20 between its operative position as shown in FIGS. 1 and 2, and the aforementioned remote position, an air cylinder 70 the flange 71 of which is attached to the elevator plate 58 has a piston rod 73 which is threaded into a portion of the base such that upon activation the cylinder, the frame 50, including the elevator plate 58, the slide rods 60, and the side plates 52, are moved downwardly as indicated by the arrow 75 as will be readily apparent to those skilled in the art. The means described for moving the applying wheel 20 can be provided by any of numerous available equivalents.

Considering the wheel in more detail, as best seen in FIG. 2, the cylindrical surface 21 is cut away to form the grooves 22 leaving a pair of circumferential ribs 80. To provide secure transport of the strip S, a multiplicity of needle points 81 are set in the ribs 80 so as to partially or completely penetrate the strip being applied. Suitable adhesion of the strip to the transfer surface 21 can be achieved by other means but the needle points are preferred for the wire-reinforced chipper strip. In addition, the wheel 20 is provided in the present embodiment with a flange 83 sufficiently larger in diameter than the transfer surface to provide a guide for one edge S' of the strip to insure that the strip is not laterally displaced.

The previously mentioned rock shaft 33 is supported rotatably in bushings 91 fixed in the respective side plates 52 and extends through one side plate to accommodate the crank 45. The air cylinder 44 which actuates the rock shaft is mounted pivotally at one end on an extension 52a of the side plate and is connected by a conventional clevis and pin 93 to the crank. The palm 30 extends forwardly from the rock shaft 33 (toward the nip 42) to place the fingers 35 respectively in the grooves 22 beneath the transfer surface 21 and the strip S thereon. The conveying surface 31 of the palm extends rearwardly from the rock shaft and is provided by a plurality of small rollers 95 preferably of nylon or the like which are rotatably mounted on pins fixed in a pair of parallel side members 30a and 30b of the palm. Alternate ones of the rollers are provided with flanges 95a which cooperate to provide a lateral edge guide for the strip edge S'.

To assist in controlling the advance of the strip, a spring plate 100 is firmly attached to the respective side members 30a, 30b of the palm and extends in overlying relation to the conveying surface 31 forwardly as a cantilever terminating at an edge 101 closely parallel to the line of the tips 36 of the fingers. The spring 100 is urged resiliently and gently against the strip S carried on the fingers 35 with sufficient pressure to prevent the strip S from being accidentally withdrawn but to allow the wheel 20 to draw the strip onto the transfer surface 21 without undue tension.

The applying wheel 20 is driven only by the rotation of the tire building drum by non-slip rolling contact therebetween. The drum is driven by conventional single revolution drive 110 and is thus independent of the diameter of the carcass C to which the strip S is applied. A conventional limit switch 112 provides means for producing a signal in response to a partial revolution of the carcass as the strip is wrapped thereon. Preferably the rotation is in excess of 270°, about three-quarters of a revolution, and preferably sufficient to bring the leading end S'' of the strip on the carcass as close to the nip 42 as is practical. In response to the signal, the drive 110 and rotation of the carcass are stopped and the air cylinder 44 is actuated to lift the fingers 35 of the palm, and the strip S held thereagainst by the spring plate 100, outwardly away from the transfer surface 21 and into severing relation with the stationary knife 40. The rotation of the tire drum is then resumed and the remaining portion of the now severed strip S is transferred onto the carcass, placing the trailing and freshly cut end S''' in suitable splicing relation with the leading edge S'' already on the carcass.

The air cylinder 44 is then actuated to rock the fingers back into the grooves in the wheel while the strip, pinched gently between the fingers and the spring plate, is pressed to the transfer surface sufficiently that the needle points 81 penetrate the new lead portion of the strip.

An optional but preferred feature of the invention is provided by a one-way clutch 120 which is mounted on the shaft 56 of the wheel and the pinion 122 which is mounted corotatably on the driving portion of the clutch 120. The pinion is engageable with a rack 124 which is fixed to an extension 65a of the base. As the wheel and its associated elements are moved away from the drum, the pinion meshing with the fixed rack 124 causes the wheel 20 to rotate, in a clockwise direction as seen in FIG. 1, sufficiently to draw the freshly cut edge of the strip forward approximately to the line of centers, that is, the plane defined by the drum axis and wheel axis. The apparatus is then ready to be moved up to its operating position to apply the narrow strip to the next carcass. The one-way clutch permits the wheel 20 and its associated elements to move into engagement with the next carcass without rotation, the pinion rolling on the rack being disconnected by the one-way clutch from the shaft of the wheel.

In addition to the advantages of simplicity and low cost, the apparatus according to the invention can automatically, accurately and rapidly place narrow strips on a carcass being built on a conventional drum. An applying apparatus for narrow strips, identical but opposite in hand, can be applied at the other end (not shown) of the tire building drum such that each apparatus can apply one of a pair of strips such as the chipper strip described at a single station. The apparatus can be used with equal facility for applying relatively narrow strips of other material in like manner. By cutting off the strip being applied close to the nip in timed relation with the amount of strip already wrapped on the carcass, an improvement in accuracy of the length of the strip is accomplished. Inherent errors in the measurement are thus reduced to a small and negligible fraction of the overall length of the strip wrapped on the carcass. The fresh end portion can be placed at or very close to the nip so that the apparatus is ready for a prompt start to transfer the strip to the carcass. Additionally, by placing the rotation sensing means in operation and association with the drum drive means, there is no necessity for mounting feelers or the like to detect the location of the leading edge of the strip wrapped about the drum.

While certain representative embodiments and details have been shown for the purpose of illustrating the invention, it will be apparent to those skilled in the art that various changes and modifications may be made therein without departing from the spirit or scope of the invention.

What is claimed is:

1. Tire building apparatus for applying narrow strip circumferentially about a tire building drum comprising a strip-applying wheel having a circumferential surface for transferring strip to a carcass on the drum, the wheel being rotatable about an axis parallel to the drum axis, a plurality of annular grooves opening to said surface, a strip control palm mounted to rock about an axis fixed parallel to the wheel axis, the palm having a strip conveying guide extending tangent to the transfer surface and having fingers extending respectively into said grooves, a knife fixed adjacent said wheel, extending transversely of the transfer surface and close to the terminals of said fingers, and means for rocking said palm to move said fingers out of the grooves to lift said strip from the transfer surface to severing relation with said knife.

2. Tire building apparatus for applying narrow strip on an incomplete tire carcass carried on a tire building drum, comprising a strip-applying wheel mounted for rotation about an axis parallel to the axis of the tire building drum and movable in a plane normal to the drum axis between a remote position and a position defining a strip-applying nip with said carcass; said wheel having a pair of circumferential ridges providing a cylindrical strip transfer surface and spaced axially of said wheel to define a plurality of annular grooves about the wheel; a multiplicity of strip penetrating needle points fixed in said ridges to extend radially of said strip transfer surface, a shaft mounting said wheel for rotation, bearing means rotatably supporting said shaft; a frame including a pair of parallel spaced side plates carrying said bearing means, an elevator plate, and a plurality of slide rods extending parallel to said plane between the respective side plates and said elevator plate; a pair of support beams extending parallel to the axis of said drum and a base slidably supported on said beams and adjustably fixed thereon relative to the axial length of the drum, said base having a plurality of slides each slidably accommodating one of said plurality of slide rods, a lift cylinder having its mounting flange secured to said elevator plate and its piston rod secured to said base and operable to move said wheel toward and away from said drum, a strip control palm for controlling advance of the strip toward said wheel, said palm having strip guide surface tangent to the strip transfer surface of said wheel adjacent said nip and a plurality of fingers each extending in one of said grooves toward said nip and beneath said strip, a spring plate fixed on said palm and biased toward said fingers to control said strip therebetween, a hot knife fixed on said frame close to said nip to cooperate with said fingers to sever said strip parallel to and between adjacent cord elements therein, a rock shaft carrying said palm to rock about an axis parallel to the wheel axis, an air cylinder operable to rock the rock shaft and palm to move said fingers out of said grooves to lift said strip into severing relation with said knife, and rotation responsive means emitting a signal at a predetermined angle of rotation of the drum and effective to actuate said air cylinder.

* * * * *